(12) United States Patent
Konia (10) Patent No.: US 7,225,151 B1
(45) Date of Patent: May 29, 2007

(54) ONLINE AUCTION BID MANAGEMENT SYSTEM AND METHOD

(76) Inventor: Brad S Konia, 1500 Bay Rd. Suite 838, Miami Beach, FL (US) 33139

( * ) Notice: Subject to any disclaimer, the term of this patent is extended or adjusted under 35 U.S.C. 154(b) by 0 days.

(21) Appl. No.: 09/491,747

(22) Filed: Jan. 27, 2000

(51) Int. Cl.
*G06Q 40/00* (2006.01)

(52) U.S. Cl. .............................. 705/37; 705/26; 705/35

(58) Field of Classification Search ............ 705/36–37, 705/25–27, 5–6, 38, 39, 90, 35
See application file for complete search history.

(56) References Cited

U.S. PATENT DOCUMENTS

| | | | |
|---|---|---|---|
| 5,794,219 A | 8/1998 | Brown ........................ | 705/37 |
| 5,818,914 A | 10/1998 | Fujisaki ................... | 379/93.12 |
| 5,826,244 A | 10/1998 | Huberman ................... | 705/37 |
| 5,835,896 A * | 11/1998 | Fisher et al. .................. | 705/37 |
| 5,890,138 A | 3/1999 | Godin et al. ................... | 705/26 |
| 5,905,974 A | 5/1999 | Fraser et al. .................. | 705/37 |
| 5,905,975 A | 5/1999 | Ausubel ....................... | 705/37 |
| 6,023,685 A * | 2/2000 | Brett et al. ................... | 705/26 |
| 6,216,114 B1 * | 4/2001 | Alaia et al. ..................... | 705/1 |
| 6,269,361 B1 * | 7/2001 | Davis et al. ................... | 707/2 |
| 6,601,044 B1 * | 7/2003 | Wallman ...................... | 705/36 |
| 6,907,405 B2 * | 6/2005 | Brett ........................... | 705/37 |
| 2003/0236739 A1 * | 12/2003 | Borgeson et al. ............. | 705/37 |

* cited by examiner

*Primary Examiner*—Hani M. Kazimi
*Assistant Examiner*—Stefano Karmis
(74) *Attorney, Agent, or Firm*—Ivan Posey; Chan Law Group LLP (57) ABSTRACT

A method and system for automatically managing an auction for determining relative priority for a service in a system wherein priority is based on the relative value of related bids is disclosed. The method comprises checking for whether a first bid exceeds a second bid in an auction for determining continuing priority for providing an ongoing service for at least a first and second bidder, wherein the relative priority for providing the service for the first bidder is dependent on whether the value of the first bid exceeds the value of the second bid, and wherein the relative priority for providing the service for the second bidder is dependent on whether the value of the second bid exceeds the value of the first bid. The method further comprises incrementing the first bid to a value exceeding the second bid if the first bid does not exceed the second bid, thereby causing the relative priority for providing service for the first bidder to exceed the priority for providing service for the second bidder. The steps of checking and incrementing may be executed a plurality of times. The system may pause for a fixed period of time between each series of steps of checking and incrementing.

24 Claims, 11 Drawing Sheets

ONLINE AUCTION BID MANAGEMENT SYSTEM AND METHOD

BACKGROUND OF THE INVENTION

For conventional online auctions such as that by EBAY by ebay, Inc. of San Jose, Calif., each item can only be sold once to the highest bidder. When the bid is accepted, the auction is over.

Continuous auctions include those for bidding for Internet search engine key-phrases in order to achieve the highest possible rankings on a search engine. The search engine found at GOTO.COM by Goto.com, Inc. of Pasadena, Calif. is an exemplary continuous auction. In this type of auction, the search engine lists web-page search results for a key-phrase search in the order of bid prices from advertisers. The advertiser with the highest bid for a given key-phrase appears first in the list, the next highest bidder appears second, etc. Since key-phrases are intangible, the same key-phrase can be sold to an unlimited number of users and the auction runs continuously with the rankings changing according to the current bids from advertisers.

As these and other types of continuous auctions become more common in many areas of commerce, it will become more difficult for bidders to monitor bids in several different auctions.

There exists a need for a system that monitors the current rankings in auctions and automatically adjusts its bids according to the rules defined by its user.

SUMMARY OF THE INVENTION

A method and system for automatically managing an auction for determining relative priority for a service in a system wherein priority is based on the relative value of related bids is disclosed. The method comprises checking for whether a first bid exceeds a second bid in an auction for determining continuing priority for providing an ongoing service for at least a first and second bidder, wherein the relative priority for providing the service for the first bidder is dependent on whether the value of the first bid exceeds the value of the second bid, and wherein the relative priority for providing the service for the second bidder is dependent on whether the value of the second bid exceeds the value of the first bid. The method further comprises incrementing the first bid to a value exceeding the second bid if the first bid does not exceed the second bid, thereby causing the relative priority for providing service for the first bidder to exceed the priority for providing service for the second bidder. The steps of checking and incrementing may be executed a plurality of times. The system may pause for a fixed period of time between each series of steps of checking and incrementing.

The service provided to the bidders may comprise providing ranking of hypertext links to web pages in search results in an on-line web page search engine, wherein ranking of a first hypertext link to a first web page for the first bidder is higher than the ranking of a second hypertext link to a second web page for the second bidder if the first bid is higher than the second bid.

The method may comprise placing bids on a plurality of search terms which may be typed into the search engine by search engine users wherein different ranking is determined for each search term, wherein the ranking of the first hypertext link is higher than the second hypertext link if the first bid is higher than the second bid for each of the plurality of search terms. The steps of checking and incrementing are executed for a plurality of search engines for the plurality of search terms.

A system for automatically managing the auction for determining relative priority for the service in a system wherein priority is based on the relative value of related bids is further disclosed. The system may comprise a processor electrically connected to a network, which is electrically connected to the plurality of search engines. A database is electrically connected to the system for storing and managing the bids.

A system and method for automatically managing an auction for determining relative priority for vendors for selling to several buyers based on the relative value of related bid is further disclosed. The system comprises a processor electrically connected to a network for checking for whether a first bid is lower than a second bid in an auction for determining priority on a server electrically connected to the network for ranking selling priority for a first and second vendor, wherein the relative priority for selling by the first vendor is dependent on whether the value of the first bid is lower than the value of the second bid, and wherein the relative priority for selling by the second vendor is dependent on whether the value of the second bid is lower than the value of the first bid. The processor is further for decrementing the first bid to a value lower the second bid if the first bid is not lower than the second bid, thereby causing the relative priority for the first vendor to exceed the priority for the second bidder.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
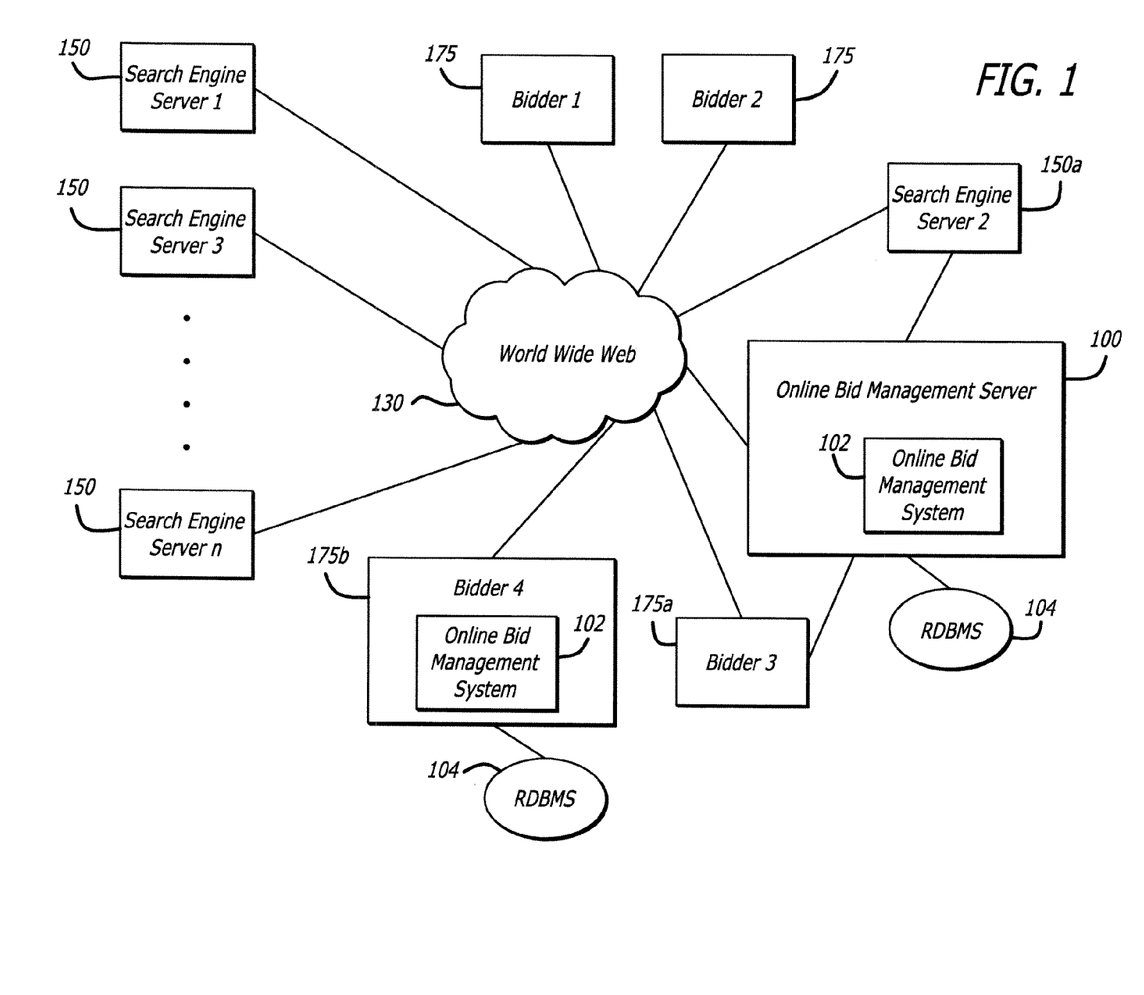
FIG. 1 is a block diagram illustrating an exemplary system architecture for one embodiment of the present invention.

With reference to FIG. 1, a block diagram illustrating an exemplary system architecture for one embodiment of the present invention is shown. The system comprises a server 100 comprising an online bid management system 102 for automatically managing an auction for determining relative priority for a service in a system wherein priority is based on the relative value of related bids.

The bid management server 100 comprises a processor electrically connected to a network. As those skilled in the art would recognize, the online bid management server 100 may comprise a standard RISC or CISC processor running the NT operating system by the Microsoft Corp. of Redmond, Wash., or a suitable UNIX server such as an ENTERPRISE Server by Sun Microsystems of Palo Alto, Calif., or an AS400 System by the IBM Corporation, USA.

Bids are made from bidder terminals or computers 175 (called bidder terminals herein) which may comprise Internet terminals with keyboards as one skilled in the art would recognize. A User may enter a bid into the online bid management system 102 through a bidder terminal 175, which transmits the bid to the bid management server 100. As it receives bids from bidder terminals 175, the online bid management system 102 prioritizes the bids periodically. The online bid management system 102 determines continuing priority for providing an ongoing service to the bidders.

The relative priorities for providing the service for bidders for their bids received from the bidder terminals 175 are dependent on whether their bids exceed the value of other bids.

The server 100 may further comprise a database 104 comprising a relational database management system (RDBMS) 104 for storing bids and data relating to the service provided to the bidders. Bidders may further enter maximum and/or minimum bids into the bidder terminals 175. The online bid management system 102 keeps track of the maximum and minimum bids for each user who enters bids into the bidder terminals 175 into RDBMS 104. The online bid management system 102 will increment the lower bids until they reach desired bidding positions entered by the bidders as long as the bids do not exceed maximum values entered by the respective bidders. Thus, the online bid management system 102 causes the relative priority for providing service to each bidder to exceed the priority for providing service with respect to other bidders as long as the maximum bid is not exceeded, or until a desired position is reached. The online bid management system 102 is further programmed to check and increment the bids a plurality of times, pausing for a fixed period of time between each checking and incrementing.

For the embodiment of FIG. 1, the service provided to the users of bidder terminals 175 comprises providing ranking of hypertext links to web pages in search results in an online web page search engine stored either on the online bid management server 100, or in one or more of several search engines 150 stored on a plurality of servers, wherein the users bid on ranking results for their web pages for terms typed into the one or more search engines 150. The search engines rank hypertext links in search results presented after a search term is entered. The web pages of bidders that bid higher than other bidders having web pages bidding for the same term are ranked higher on the search results. The online bid management system 102 receives maximum and minimum bids on a plurality of search terms that may be typed into the search engine by search engine users wherein different rankings are determined for each search term for each of a plurality of bidders.

One of the plurality of search engines 150a may be directly electrically connected to the online bid management sever 100 to facilitate faster updating of ranking of hypertext links on the search engine 150a. Similarly, a bidder terminal 175a may be directly electrically connected to the online bid management server 100 so that bids may be updated faster to the online bid management system 102.

As an alternative to having a centralized bid management system 102, the online bid management system may be stored locally on one or more bidder terminals 175b. The bidder terminal 175b comprises, or is electrically connected to, a RDBMS 104 which keeps track of bids made on the bidder terminal 175b by one or several users. The system on the bidder terminal 175b works in similar fashion to that on the online bid management server 100.

Figure 2:
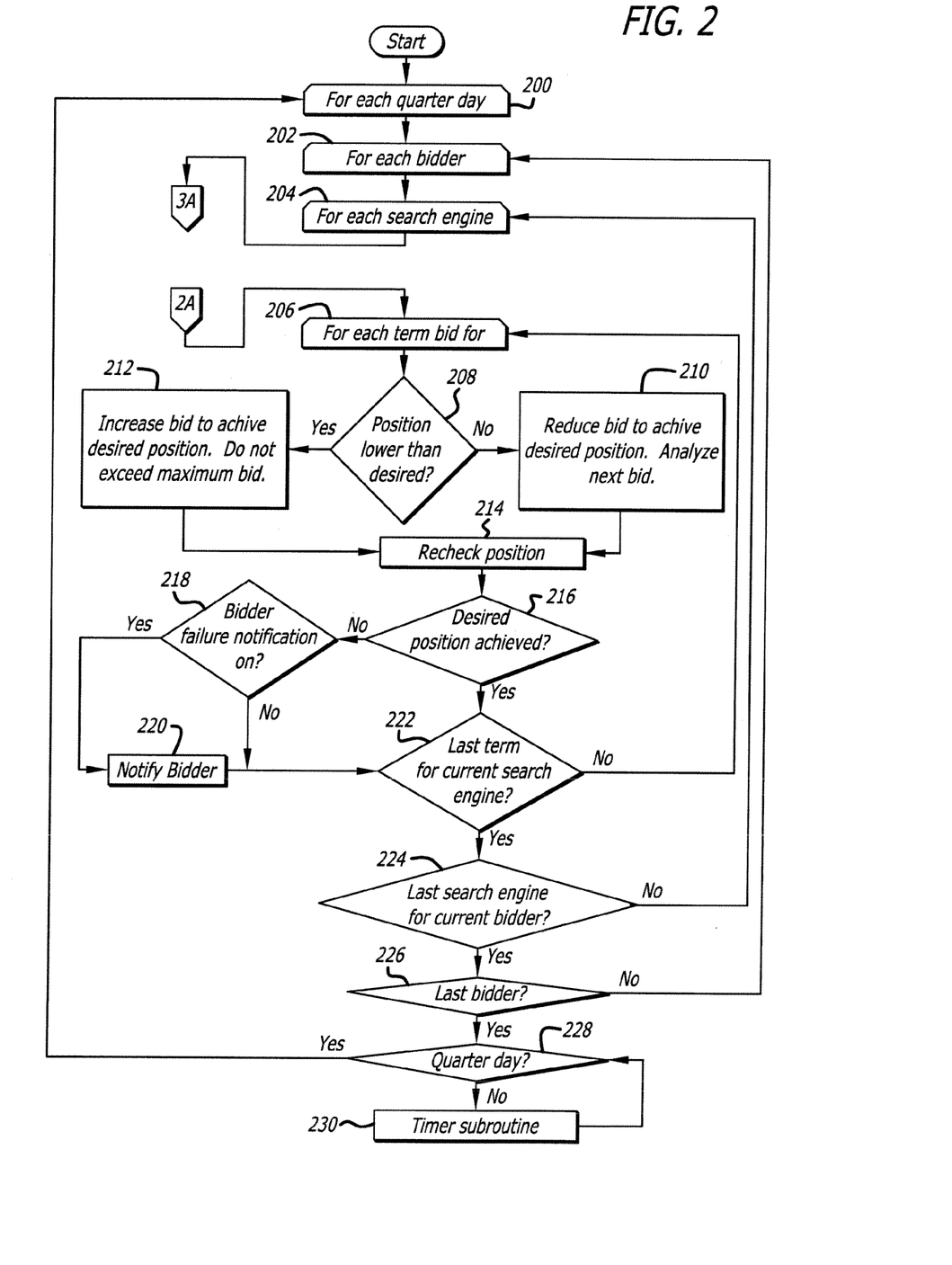
FIGS. 2-3 are flow diagrams illustrating a method performed by the system of FIG. 1.

With reference to FIG. 2 a flow diagram illustrating a method performed by the online bid management systems 102 of FIG. 1 is shown. The method is for automatically managing the auction for determining relative priority for a service in a system wherein priority is based on the relative value of related bids. The system is programmed into a series of nested loops. The outer loop, starting at step 200, comprises a timing mechanism which times the updating of bids for a plurality of search engines 150. At step 202, the system loops through each subscribing bidder's bids for bidders who have subscribed to the management system 102. At step 204, the system loops through each search engine 150 for which the particular bidder has bid on terms for ranking their web site.

Figure 3:
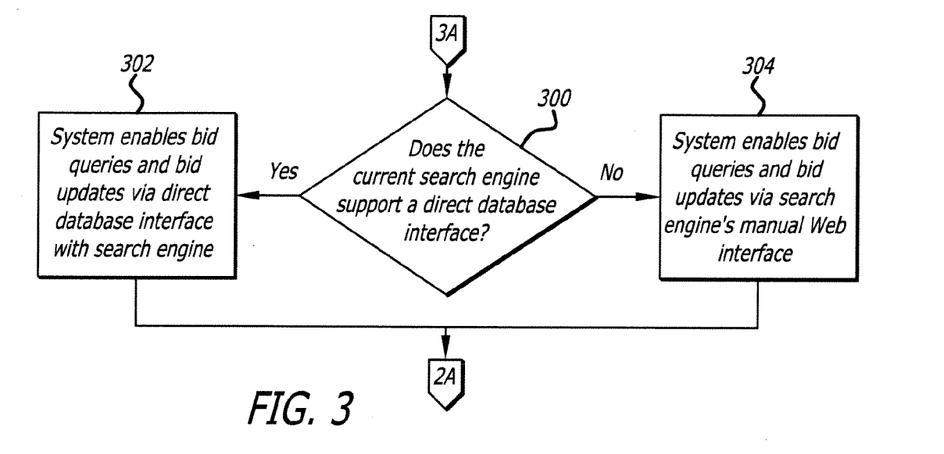

Processing moves temporary to FIG. 3, where the system checks to see if the current search engine in the loop supports a direct database interface, step 300. With respect to this step, certain search engines may comply with the system, allowing the online bid management system 102 to directly access and update bid rankings on their search engine. If such is the case, processing moves to step 302 which implements the direct querying and updating of the search engine 150. Otherwise, processing moves to step 304 for which the online bid management system 102 affects queries and updates to the search engine through the particular search engine's web interface. After enabling access to the search engine 150, processing moves to step 206 in FIG. 2.

In step 206, the system loops through each term that the bidder has bid on in the current search engine 150 of the loop established in step 204. The system checks for whether the bidder's desired position is met for the particular web page and term, step 208. For example, the system checks for whether the bidder's bid exceeds all other bids in the auction for determining continuing priority for listing the bidder's web page. Another example allows the bidder to choose a position, such as fourth in the results listing. If the system finds that the bidder has achieved the proper position in the search engine with respect to the current term being processed, the system may reduce the bid to a minimum which allows the bidder to keep the position, step 210. Otherwise, the system increases the bid without exceeding the maximum bid entered by the bidder, step 212.

The system re-checks the position held by the bidder, step 214. If the desired position is not achieved, step 216, the system checks to see if the bidder had set a notification flag so that the bidder would be notified if the desired position had not been achieved, step 218. If the bidder had desired to be notified, the bidder is notified, step 220. Notification may be by a standard technique such as e-mail.

The system checks to see if the last term for the current search engine has been checked, step 222. If the last term has not been checked for the current search engine, then processing moves back to step 206. Otherwise, the system checks to see if the last search engine has been addressed for the current user, step 224. If not, then processing moves back to step 204. Otherwise, the system checks to see the last of the bidder's positions have been checked, step 226. If not, then processing moves back to step 202. Otherwise, the bid management system 102 checks to see of the last bidder has been processed, step 226. If not, then processing moves back to step 202. Otherwise, the system checks the timing loop, in this case a quarter day, for whether it is time to process all of the bidders' positions again, steps 228-230. Once the timer has determined that it is time to check the bidders' positions again, processing moves back to step 200.

Figure 4:
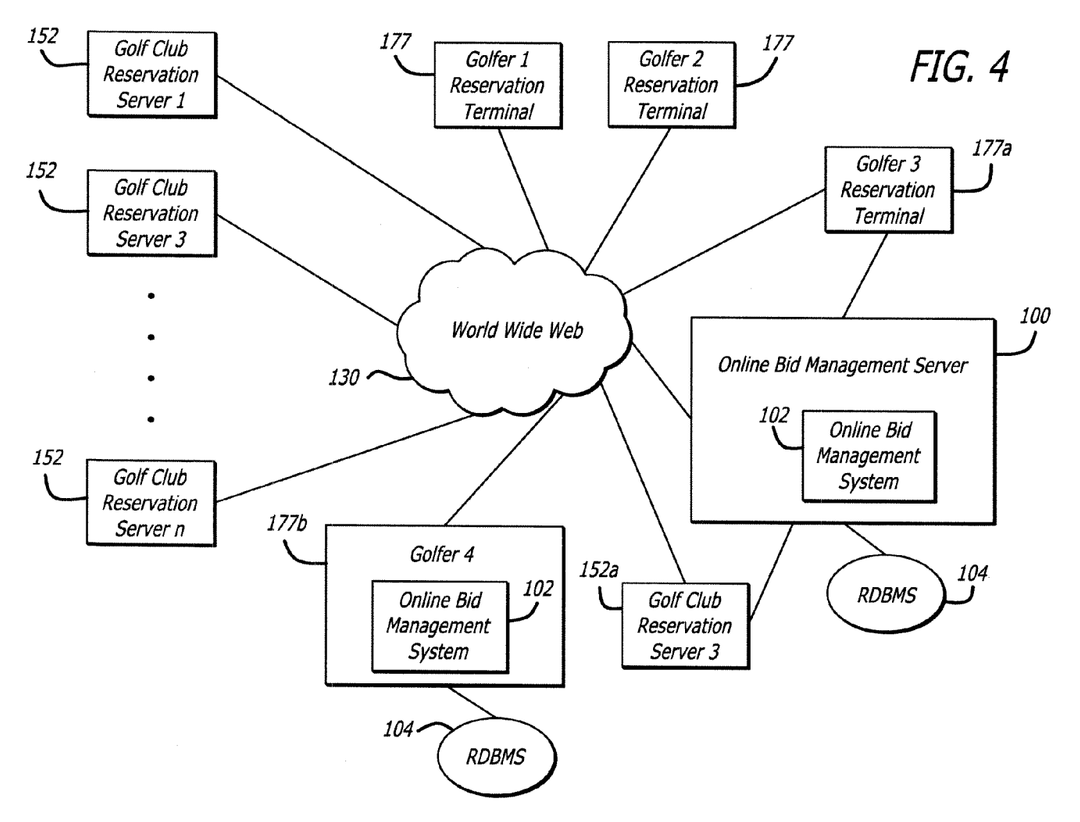
FIG. 4 is a block diagram illustrating an exemplary system architecture for another embodiment of the present invention.

With reference to FIG. 4, a block diagram illustrating an exemplary system architecture for another embodiment of the present invention for managing golf course tee-off time reservations is shown. The system comprises a server 100 comprising an online bid management system 102 for automatically managing an auction for determining relative priority for a service in a system wherein priority is based on the relative value of related bids.

As with the server 100 of FIG. 1, the bid management server 100 comprises a processor electrically connected to a network. As those skilled in the art would recognize, the online bid management server 100 may comprise a standard RISC or CISC processor running the NT operating system by the Microsoft Corp. of Redmond, Wash., or a suitable UNIX server such as an ENTERPRISE Server by Sun Microsystems of Palo Alto, Calif., or an AS400 System by the IBM Corporation, USA.

Bids are made from bidder terminals 177 (called golfer reservation terminals in FIG. 4) which may comprise Internet terminals with keyboards as one skilled in the art would recognize. A user may enter a bid into the online bid management system 102 through a bidder terminal 177, which transmits the bid to the bid management server 100. As it receives bids from bidder terminals 177, the online bid management system 102 prioritizes the bids periodically. The online bid management system 102 determines continuing priority for providing an ongoing service to the bidders.

The relative priorities for providing the service for bidders for their bids received from the bidder terminals 177 are dependent on whether their bids exceed the value of other bids.

The server 100 may further comprise a database 104 comprising a relational database management system (RDBMS) 104 for storing bids and data relating to the service provided to the bidders. Bidders may further enter maximum and/or minimum bids into the bidder terminals 177. The online bid management system 102 keeps track of the maximum and minimum bids for each user who enters bids into the bidder terminals 177 by storing the bids in RDBMS 104. The online bid management system 102 increments the lower bids until they reach desired bidding positions entered by the bidders as long as the bids do not exceed maximum values entered by the respective bidders. Thus, the online bid management system 102 causes the relative priority for providing service to each bidder to exceed the priority for providing service with respect to other bidders as long as the maximum bid is not exceeded, or until a desired position is reached. The online bid management system is further programmed to check and increment the bids a plurality of times, pausing for a fixed period of time between each checking and incrementing.

For the embodiment of FIG. 4, the service provided to the users of bidder terminals 177 comprises providing ranking of priority for golf course tee-off times on one or several golf courses having golf club reservation servers 152. On their reservation servers 152, golf courses may rank premium tee-off times based on what their members, or the public for public courses, are willing to pay. For example, a premium tee-off time may be 9:00 am Saturday morning. Bids may be accepted for the 9:00 am tee-off time, the highest bidder receiving the 9:00 am time, with other bidders bidding less than the highest bidder receiving tee-off times as close to the 9:00 am time as possible for each particular bid. The online bid management system 102 receives maximum and minimum bids on a plurality of golf courses wherein tee-off times are determined by bidding.

One of the plurality of reservation servers 152*a* may be directly, electrically, connected to the online bid management sever 100 to facilitate faster updating of ranking of golf reservations on the reservation server 152*a*. Similarly, a bidder terminal 177*a* may be directly electrically connected to the online bid management server 100 so that bids may be updated faster to the online bid management system 102.

As an alternative to having a centralized bid management system 102, the online bid management system 102 may be stored locally on one or more bidder terminals 177*b*. The bidder terminal 177*b* comprises, or is electrically connected to, an RDBMS 104 which keeps track of bids made on the bidder terminal 177*b* by one or several golfers. The system on the bidder terminal 177*b* works in similar fashion to that on the online bid management server 100.

Figure 5:
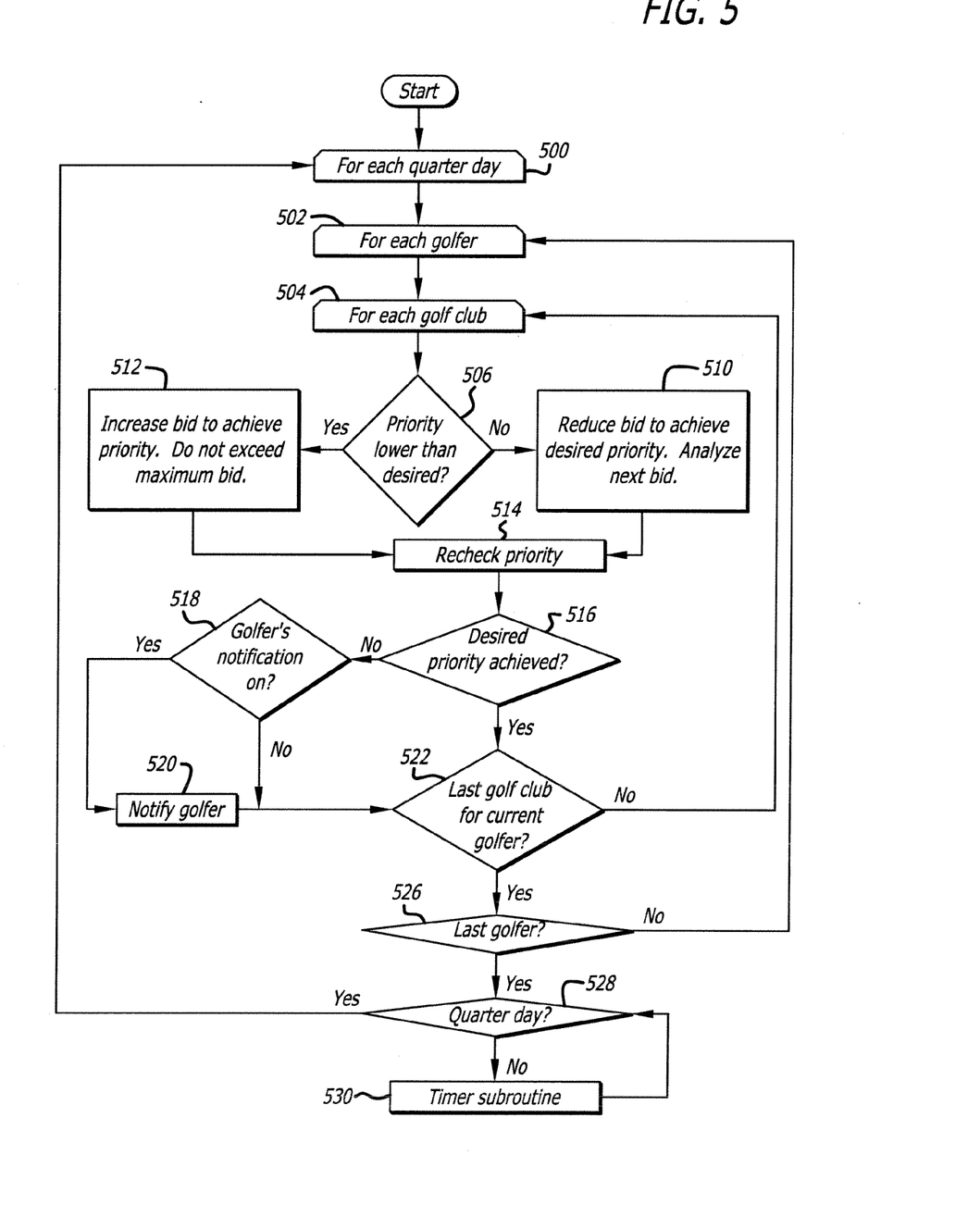
FIG. 5 is a flow diagram illustrating a method performed by the system of FIG. 4.

With reference to FIG. 5 a flow diagram illustrating a method performed by the online bid management systems 102 of FIG. 4 is shown. The method is for automatically managing the auction for determining relative priority for a service in a system wherein priority is based on the relative value of related bids. The system is programmed into a series of nested loops. The outer loop, starting at step 500, comprises a timing mechanism which times the updating of bids for a plurality of search engines 150. At step 502, the system loops through the bids for each golfer who made bids for tee off times on one or more golf courses on the bid management system 102. At step 504, the system loops through each bid for each golf club for the golfer.

The system checks for whether the golfer's desired position is met for tee-off time priority on a particular course, step 506. For example, the system checks for whether the golfer's bid exceeds all other bids in the auction for determining priority for a preferred tee-time. Another example allows the bidder to choose a tee-time, such as 9:30 am instead of the premium time of 9:00 am. If the system finds that the golfer has achieved the requested tee-time priority in the search engine with respect to the current golf reservation server 152 processed, the system may reduce the bid to a minimum which allows the bidder to keep the desired tee-time, step 510. Otherwise, the system increases the bid without exceeding the maximum bid entered by the golfer, step 512.

The system re-checks the position held by the golfer, step 514. If the desired position is not achieved, step 516, the system checks to see if the golfer had set a notification flag so that the golfer would be notified if the desired position had not been achieved, step 518. If the golfer had desired to be notified, the golfer is notified, step 520. Notification may be by a standard technique such as e-mail or voice telecommunication.

The system checks to see if the last golf club for the current golfer has been checked, step 522. If the last golf club has not been checked for the current golfer, then processing moves back to step 504. Otherwise, the system checks to see the last golfer's positions have been checked, step 526. If not, then processing moves back to step 502. Otherwise, the system checks the timing loop, in this case a quarter day, for whether it is time to process all of the golfers' positions again, steps 528-530. Once the timer has determined that it is time to check the golfers' positions again, processing moves back to step 500.

Figure 6:
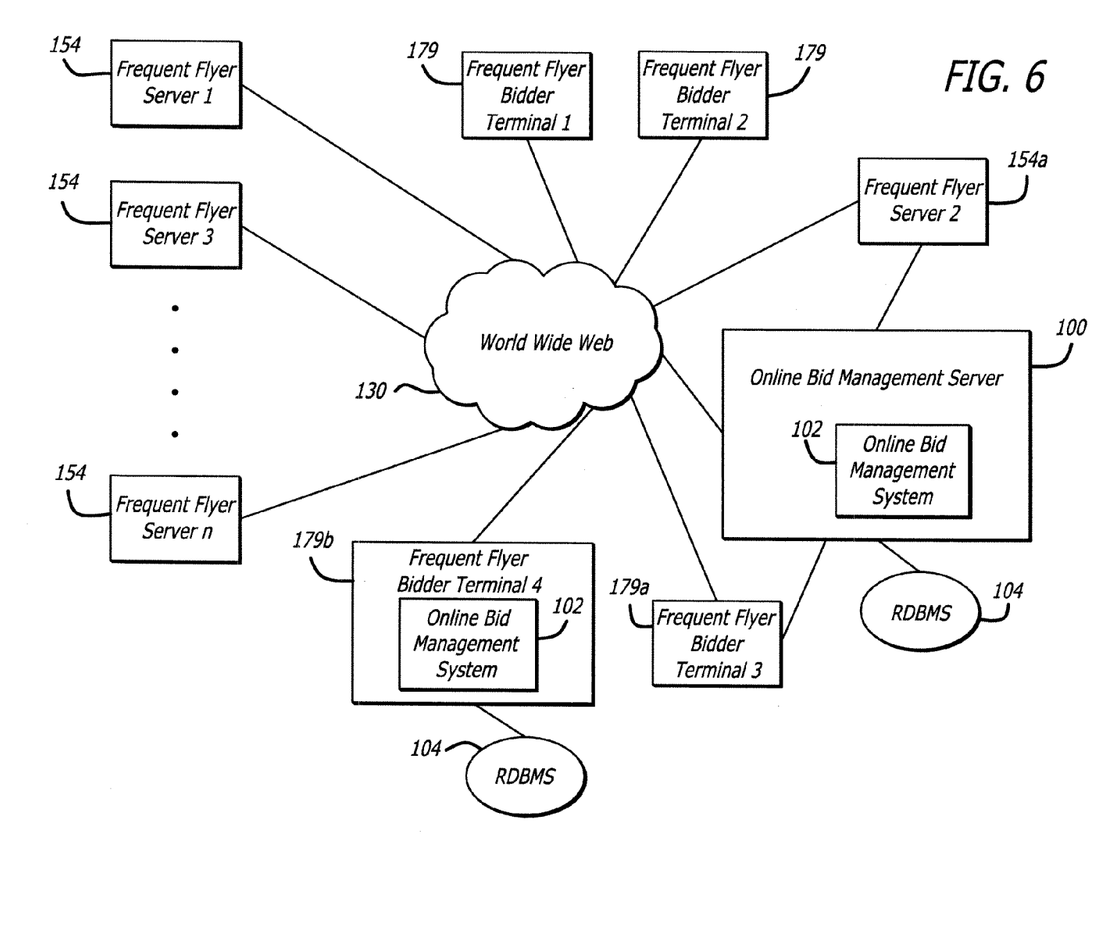
FIG. 6 is a block diagram illustrating an exemplary system architecture for another embodiment of the present invention.

With reference to FIG. 6, a block diagram illustrating an exemplary system architecture for another embodiment of the present invention for managing frequent flyer reservations on airlines is shown. As with the embodiments shown in FIGS. 1 and 4, the system comprises a server 100 comprising an online bid management system 102 for automatically managing an auction for determining relative priority for a service in a system wherein priority is based on the relative value of related bids.

As with the server 100 of FIGS. 1 and 4, the bid management server 100 comprises a processor electrically connected to a network. As those skilled in the art would recognize, the online bid management server 100 may comprise a standard RISC or CISC processor running the NT operating system by the Microsoft Corp. of Redmond, Wash., or a suitable UNIX server such as an ENTERPRISE Server by Sun Microsystems of Palo Alto, Calif., or an AS400 System by the IBM Corporation, USA.

Bids are made from bidder terminals 179 (called frequent flyer reservation terminals in FIG. 6) which may comprise Internet terminals with keyboards as one skilled in the art would recognize. A frequent flyer member may enter a bid into the online bid management system 102 through a bidder terminal 179, which transmits the bid to the bid management server 100. As it receives bids from bidder terminals 179, the online bid management system 102 prioritizes the bids periodically. The online bid management system 102 determines continuing priority for providing an ongoing service to the frequent flyers.

The relative priorities for providing the service for frequent flyers for their bids received from the bidder terminals 179 are dependent on whether their bids exceed the value of other bids.

The bid management server 100 may further comprise a database 104 comprising a relational database management system (RDBMS) 104 for storing bids and data relating to the service provided to the frequent flyers. Frequent flyers may further enter maximum and/or minimum bids into the bidder terminals 179. The online bid management system 102 keeps track of the maximum and minimum bids for each frequent flyer who enters bids into the bidder terminals 179 into RDBMS 104. The online bid management system 102 will increment the lower bids until they reach desired bidding positions entered by the frequent flyers as long as the bids do not exceed maximum values entered by the respective frequent flyers. Thus, the online bid management system 102 causes the relative priority for providing service to each frequent flyer to exceed the priority for providing service with respect to other frequent flyers as long as the maximum bid is not exceeded, or until a desired position is reached. The online bid management system is further programmed to check and increment the bids a plurality of times, pausing for a fixed period of time between each checking and incrementing.

For the embodiment of FIG. 6, the service provided to the users of bidder terminals 179 comprises providing ranking of priority for airline reservations on one or several airlines having airline reservation servers 154. On their reservation servers 154, airlines may rank premium seats based on what their frequent flyer club members are willing to pay. For example, a premium seat may be a seat in the first class section of a flight between Los Angeles and New York, a highly traveled route. Bids may be accepted for the first class seats, the highest bidder receiving the first choice in the first class lounge of the flight, with other bidders bidding less than the highest bidder receiving subsequent choices for seating for each particular bid, all the way down to the least desirable seat for the flight. Premium times on flight schedules may be auctioned in similar manner. The online bid management system 102 receives maximum and minimum bids on a plurality of airlines for which seating is determined by bidding.

One of the plurality of reservation servers 154*a* may be directly, electrically, connected to the online bid management sever 100 to facilitate faster updating of ranking of flight reservations on the reservation server 154*a*. Similarly, a bidder terminal 179*a* may be directly electrically connected to the online bid management server 100 so that bids may be updated faster to the online bid management system 102.

As an alternative to having a centralized bid management system 102, the online bid management system 102 may be stored locally on one or more bidder terminals 179*b*. The bidder terminal 179*b* comprises or is electrically connected to a RDBMS 104 which keeps track of bids made on the bidder terminal 179*b* by one or several frequent flyers. The system on the bidder terminal 179*b* works in similar fashion to that on the online bid management server 100.

Figure 7:
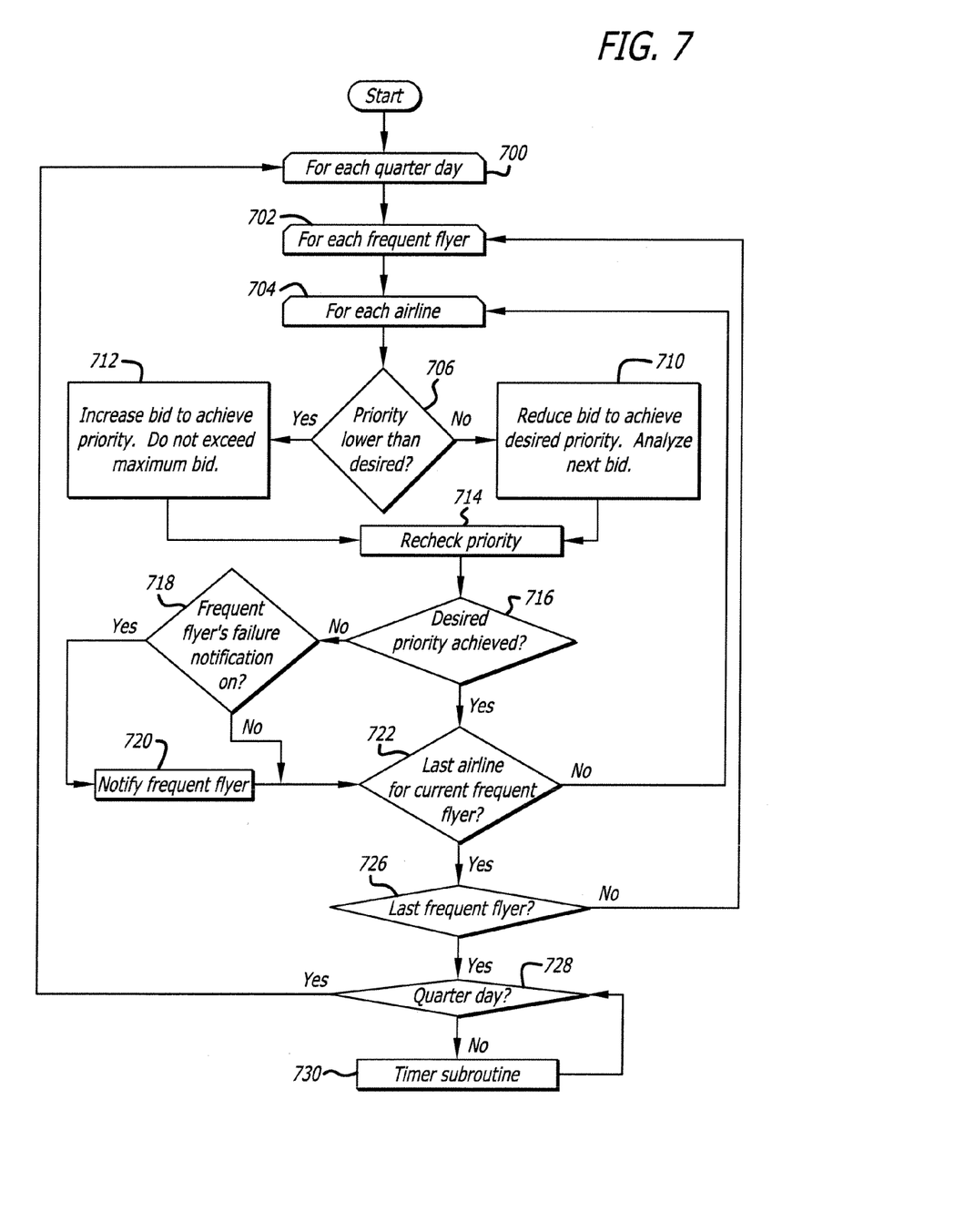
FIG. 7 is a flow diagram illustrating a method performed by the system of FIG. 6.

With reference to FIG. 7, a flow diagram illustrating a method performed by the online bid management systems 102 of FIG. 6 is shown. The method is for automatically managing the auction for determining relative priority for a service in a system wherein priority is based on the relative value of related bids. The system is programmed into a series of nested loops. The outer loop, starting at step 700, comprises a timing mechanism or procedure which times the updating of bids for a plurality frequent flyer servers 154. At step 702, the system loops through the bids for each frequent flyer who made bids on the bid management system 102. At step 704, the system loops through each bid for each airline for which bids are submitted by the particular frequent flyer.

The system checks for whether the frequent flyer's desired position is met for determining seating priority for a particular airline, step 706. For example, the system checks for whether the frequent flyer's bid exceeds all other bids in the auction for determining priority for preferred seating. Another example allows the bidder to choose a desired seat, such as first-class front row, and the system can determine the cheapest position that can be taken for the frequent flyer to be given that seat selection relative to the other frequent flyers. If the system finds that the frequent flyer has achieved the desired seating priority with respect to the current frequent flyer reservation server 154 processed, the system may reduce the bid to a minimum which allows the frequent flyer to keep the desired seating priority, step 710. Otherwise, the system increases the bid without exceeding the maximum bid entered by the frequent flyer, step 712.

The system re-checks the position held by the frequent flyer, step 714. If the desired position is not achieved, step 716, the system checks to see if the frequent flyer had set a notification flag so that the frequent flyer would be notified if the desired position had not been achieved, step 718. If the frequent flyer had desired to be notified, the frequent flyer is notified, step 720. Notification may be by a standard technique such as e-mail or voice telecommunication.

The system checks to see if the last frequent flyer server 154 for the current frequent flyer has been checked, step 722. If the last frequent flyer server 154 has not been checked for the current frequent flyer, then processing moves back to step 704. Otherwise, the system checks to see if the last frequent flyer's positions have been checked, step 726. If not, then processing moves back to step 702. Otherwise, the system checks the timing loop, in this case a quarter day, for whether it is time to process all of the frequent flyers' positions again, steps 728-730. Once the timer has determined that it is time to check the frequent flyers' positions again, processing moves back to step 700.

Figure 8:
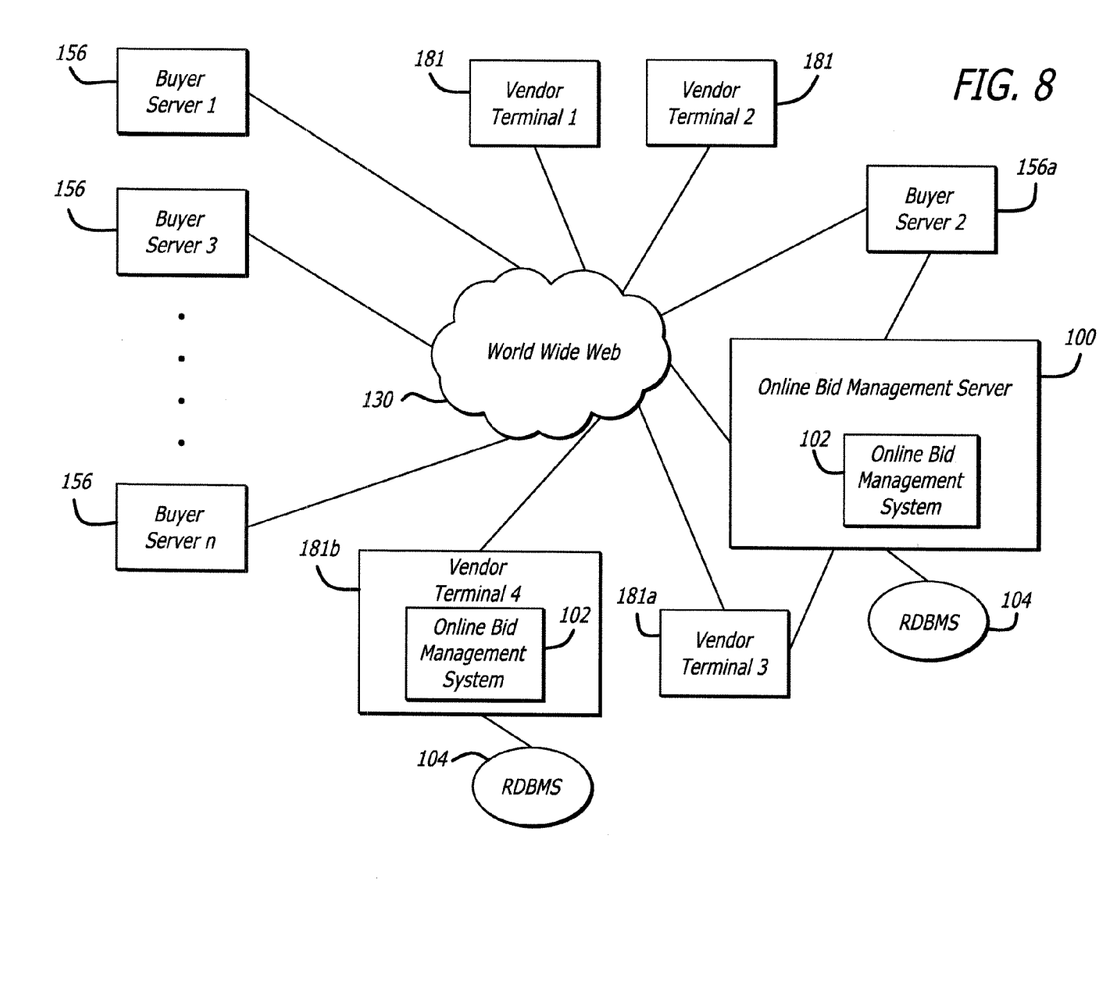
FIG. 8, is a block diagram illustrating an exemplary system architecture for another embodiment of the present invention.

With reference to FIG. 8, a block diagram illustrating an exemplary system architecture for another embodiment of the present invention for managing vendor-buyer sales is shown. As with the embodiments shown in FIGS. 1, 4 and 6, the system comprises a server 100 comprising an online bid management system 102 for automatically managing an auction. In the case with the embodiment of FIG. 8, the online bid management system 102 is for determining relative priority for a bids for supplying goods or services to vendors.

As with the server 100 of FIGS. 1, 4 and 6, the bid management server 100 comprises a processor electrically connected to a network. As those skilled in the art would recognize, the online bid management server 100 may comprise a standard RISC or CISC processor running the NT operating system by the Microsoft Corp. of Redmond, Wash., or a suitable UNIX server such as an ENTERPRISE Server by Sun Microsystems of Palo Alto, Calif., or an AS400 System by the IBM Corporation, USA.

Bids are made from bidder terminals 181 (called vendor terminals in FIG. 8) which may comprise Internet terminals with keyboards as one skilled in the art would recognize. A vendor may enter a bid into the online bid management system 102 through a bidder terminal 181, which transmits the bid to the bid management server 100. As it receives bids from bidder terminals 181, the online bid management system 102 prioritizes the bids periodically. The online bid management system 102 determines continuing priority for the vendors' relative priority for selling goods and services to buyers.

The relative priorities for the vendors providing goods or services to the buyers are dependent on whether the vendors' bids entered into the vendor terminals 181 are lower than other vendors bids entered.

The bid management server 100 may further comprise a database 104 comprising a relational database management system (RDBMS) 104 for storing bids and data relating to the goods or services to be provided to the buyers. Vendors may further enter minimum and/or maximum bids into the bidder terminals 181. The online bid management system 102 keeps track of the minimum and maximum bids for each of the vendors who enter bids into the bidder terminals 181 into RDBMS 104. The online bid management system 102 will start with the maximum bid from each vendor and increment the higher bids until they reach desired bidding positions entered by the vendors as long as the bids do not fall below the minimum values entered by the respective vendors. Thus, the online bid management system 102 causes the relative priority for a first vendor's selling of goods or services to a buyer to change with respect to the priority for a second vendor's priority for selling of goods and services to the buyer by lowering the first vendor's bid until the priority for, first vendor exceeds the second vendor's priority, or until a desired priority position for the first vendor is reached. The online bid management system is further programmed to check and lower bids a plurality of times, pausing for a fixed period of time between each checking and lowering of bids.

For the embodiment of FIG. 8, the service provided to the users of bidder terminals 181 comprises providing ranking of priority for selling to several buyers having buyer servers 156. On their buyer servers 154, buyers may rank the order in which each buyer uses vendors who desire to sell goods or serves to the buyers. For example, a buyer may need to purchase personal computers from vendors in the amount of 100,000 units. Bids may be accepted for priority for buying computers from selected vendors, the lowest biding vendor having the opportunity to provide as many computers as that vendor can supply, with other vendors bidding more than the lowest bidder selling units until the full number of desired units have been purchased. The system may comprise a method for selling and purchasing in lots or groups of units instead of individual units for high volume sales. The online bid management system 102 receives minimum and maximum bids from a plurality of vendors who desire to sell goods or services.

One of the plurality of buyer servers 154*a* may be directly, electrically connected to the online bid management sever 100 to facilitate faster updating of ranking of bids for purchasing goods. Similarly, a vendor terminal 181*a* may be directly electrically connected to the online bid management server 100 so that bids may be updated faster to the online bid management system 102.

As an alternative to having a centralized bid management system 102, the online bid management system 102 may be stored locally on one or more vendor terminals 181*b*. The vendor terminal 181*b* comprises, or is electrically connected to, a RDBMS 104 that keeps track of bids made on the vendor terminal 181*b* by one or several vendors. The system on the vendor terminal 181*b* works in similar fashion to that on the online bid management server 100.

Figure 9:
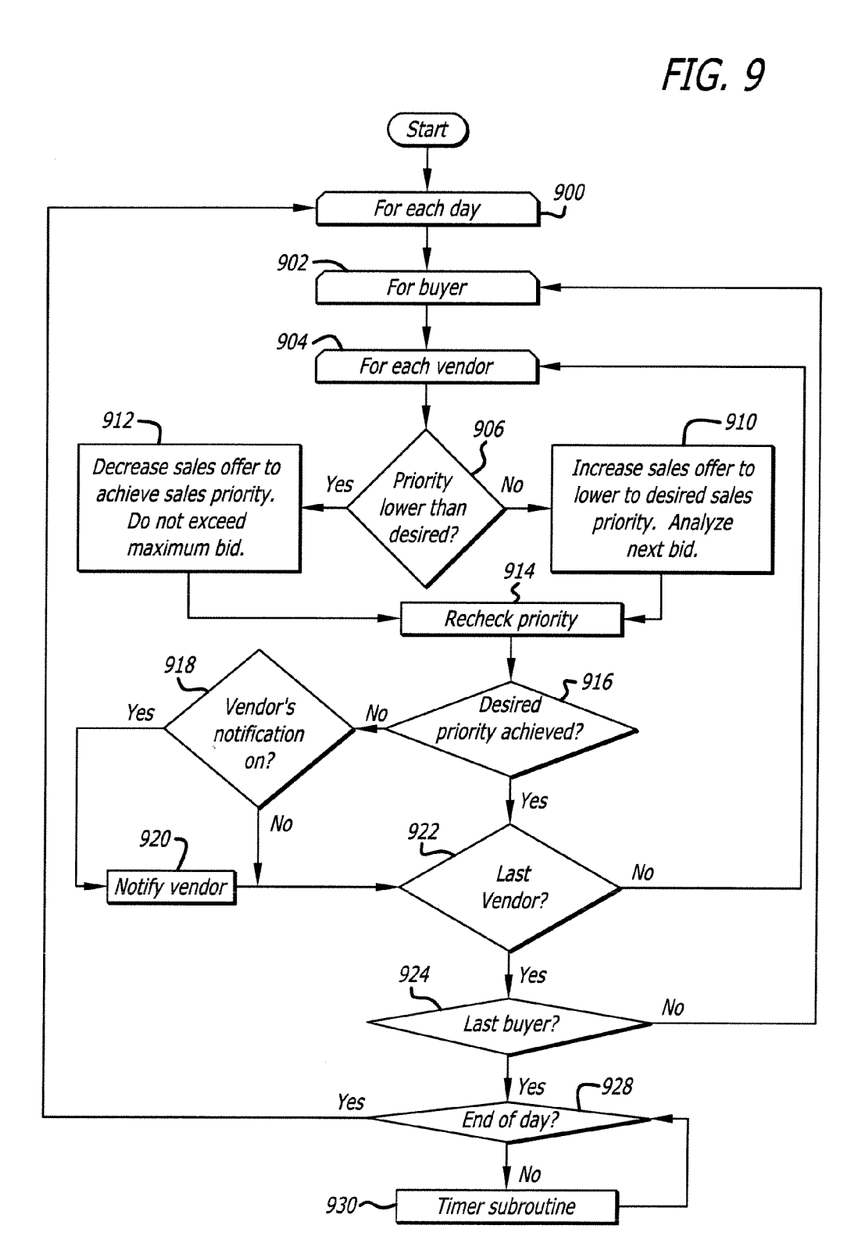
FIG. 9 is a flow diagram illustrating a method performed by the system of FIG. 8.

With reference to FIG. 9 a flow diagram illustrating a method performed by the online bid management systems 102 of FIG. 8 is shown. The method is for automatically managing the auction for determining relative priority for vendors selling goods or services to buyers in a system wherein sales are based on the relative value of related bids. The system is programmed into a series of nested loops. The outer loop, starting at step 900, comprises a timing mechanism which times the updating of bids for a plurality buyer servers 156. At step 902, the system loops through the buyers for which bids for sales are made in the online bid management system 102. At step 904, the system loops through each bid for each vendor who submitted bids for sales to the buyers.

The system checks for whether the vendor's desired position is met for determining sales priority for a particular buyer, step 906. For example, the system checks for whether the vendor's bid is lower than all other bids in the auction for determining priority for selling computers. Another example allows the vendor to choose a desired sales position, such as third in line for sales priority, and the system can determine the maximum that the vendor's bid can be to obtain the third priority position. If the system finds that the vendor has achieved the desired selling position with respect to the buyer server 156 being processed, the system may increase the bid to a maximum which allows the bidder to keep the desired sales priority, step 910. Otherwise, the system decreases the bid without lowering the bid below the minimum bid entered by the vendor, step 912.

The system re-checks the position held by the vendor, step 914. If the desired position is not achieved, step 916, the system checks to see if the vendor had set a notification flag so that the vendor would be notified if the desired position had not been achieved, step 918. If the vendor had desired to be notified, the vendor is notified, step 920. Notification may be by a standard technique such as e-mail.

The system checks to see if the last vendor the current buyer server 156 has been checked, step 922. If the last vendor has not been checked for the current buyer server 156, then processing moves back to step 904. Otherwise, the system checks to see the last buyer server 156 has been processed, step 924. If not, then processing moves back to step 902. Otherwise, the system checks the timing loop, in this case each day, for whether it is time to process all of the vendors' positions again, steps 928-930. Once the timer has determined that it is time to check the vendors' positions again, processing moves back to step 900.

Figure 10:
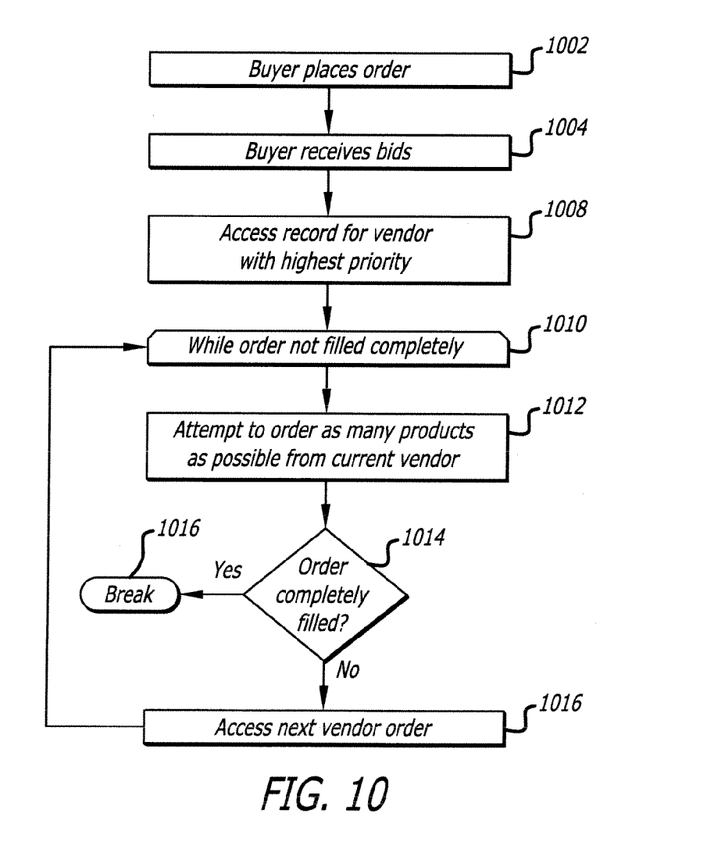
FIG. 10, is a flow diagram illustrating the steps performed by a buyer server of the system of FIG. 8.

With reference to FIG. 10, a flow diagram illustrating the steps performed by a buyer server 156 is shown. The buyer first places an order, step 1002. Placing an order may comprise sending a broadcast message onto the world-wide-web 130 (FIGS. 1, 4, 6 and 8), or by sending mail to vendors, or e-mail to several vendors. If the order is performed by e-mail, then the vendors may view the e-mail on their respective vendor terminals 181.

The buyer receives the current bids placed by the vendors, step 1004. Step 1004 may comprise retrieving the bids from the RDBMS 104, or retrieving bids received on a regular bases from one or more online bid management systems 102.

The buyer server 156 accesses the vendor bid record having the highest priority, step 1008. The buyer server 156 executes a program loop to purchase all needed products or services, step 1010. The buyer server 156 attempts to order as many products as possible from the current vendor, step 1012, which is the vendor with the highest priority on the first run through the loop. The system checks to see if the buyer's order has been completely filled, step 1014. If the whole order could not be filled with the current vendor, the buyer server 156 accesses the next vendor record having the next highest priority, and processing moves back to step 1010. Otherwise, if the whole order was able to be filled with the current vendor, then processing of the order ends, step 1016.

Another embodiment of the present invention is one related to e-commerce or online stores. This embodiment allows vendors to bid for positions within a category of an online store. In previous systems, a user accesses an e-commerce web site such as BUY.COM and searches for "modems." In typical e-commerce web sites, also called online stores, the results listings that the user views after submitting the search comprises hundreds of modems from dozens of different vendors. Typically, the list is arranged in either alphabetical order or according to price.

With the system of the present invention, vendors can bid for their individual products to be listed at the top of the search results (on a product-by-product basis), in the same way as bidders bid for positions in the embodiment of FIGS. 1-3. The vendor's inventory system is connected to the bid management system 102. As inventory levels rise for a particular product, the inventory system feeds that data into the bid management system 102, which automatically increases bids for that product in an attempt to unload excess inventory. As inventory levels fall, the opposite process occurs. Bids are reduced to avoid over-promoting a product that has low inventory levels. Essentially, this embodiment is sophisticated version of the bid adjustment rules described with respect to FIGS. 1-3. Rather than simply setting minimum and maximum bids, the bids, and possibly the minimum and maximum bids, are dynamically adjusted according to current inventory levels on each product.

Figure 11:
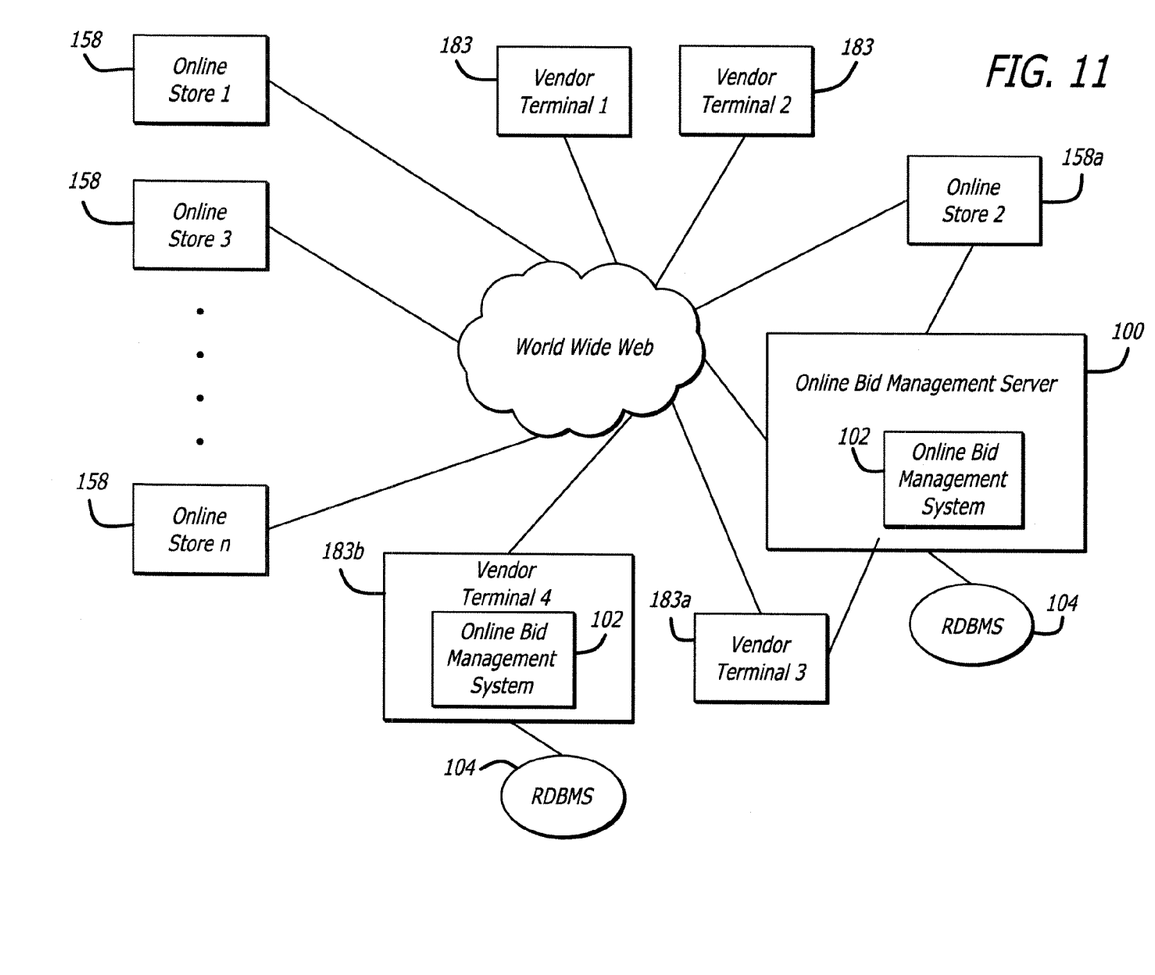
FIG. 11, is a block diagram illustrating an exemplary system architecture for another embodiment of the present invention.

With reference to FIG. 11, a block diagram illustrating an exemplary system architecture for the presently described embodiment for managing vendor-online store listing priority is shown. As with the embodiments shown in FIGS. 1, 4, 6 and 8, the system comprises a server 100 comprising an online bid management system 102 for automatically managing an auction. In the case with the embodiment of FIG. 11, the online bid management system 102 is for determining relative priority for bids for listing products in online stores for vendors.

As with the server 100 of FIGS. 1, 4, 6 and 8, the bid management server 100 comprises a processor electrically connected to a network. As those skilled in the art would recognize, the online bid management server 100 may comprise a standard RISC or CISC processor running the NT operating system by the Microsoft Corp. of Redmond, Wash., or a suitable UNIX server such as an ENTERPRISE Server by Sun Microsystems of Palo Alto, Calif., or an AS400 System by the IBM Corporation, USA.

Product inventories are entered into vendor terminals 183 which may comprise Internet terminals with keyboards as one skilled in the art would recognize. A vendor enters product inventories for its products listed in online stores 158 into the online bid management system 102 through a vendor terminal 183, which transmits the product inventory data to the bid management server 100. As it receives product inventories from the vendor terminals 183, the online bid management system 102 checks product inventories periodically. Based on the inventory data, the online bid management system 102 determines proper bids for maintaining listing priority for the vendor's products in the online stores 158.

The relative priority for listing each of a vendor's products in online stores is dependent on whether the inventory for each product is higher with respect the vendor's other products.

The bid management server 100 may further comprise a database 104 comprising a relational database management system (RDBMS) 104 for storing bids for the product listings and corresponding data relating to inventory data for the corresponding products. Vendors may further enter minimum and/or maximum bids into the bidder terminals 183. The inventory data is stored and updated periodically, e.g. monthly, for each product each vendor is selling in each online store. For each vendor, the online bid management system 102 measures relative inventories for each of the vendor's products. For those products which have higher relative inventories, the bid management system 102 increments the bids higher to reach higher listing positions as long as the bids do not exceed the maximum values entered by the respective vendor. Thus, the online bid management system 102 causes the relative priority for listing the high inventory products to increase until a higher sales cause the inventory to drop with respect to the vendor's other products. As inventory lowers for a product, then the bids for the product are steadily decreased to lower the product's listing orders in the online stores. The online bid management system is further programmed to check inventories a plurality of times, pausing for a fixed period of time between each checking of inventories.

One of the plurality of online stores 158a may be directly, electrically, connected to the online bid management sever 100 to facilitate faster updating of ranking of bids for listing products. Similarly, a vendor terminal 183a may be directly electrically connected to the online bid management server 100 so inventories may be updated faster to the online bid management system 102.

As an alternative to having a centralized bid management system 102, the online bid management system 102 may be stored locally on one or more vendor terminals 183b. The vendor terminal 183b comprises, or is electrically connected to, a RDBMS 104 which keeps track of inventories for one or several vendors. The system on the vendor terminal 183b works in similar fashion to that on the online bid management server 100.

Figure 12:
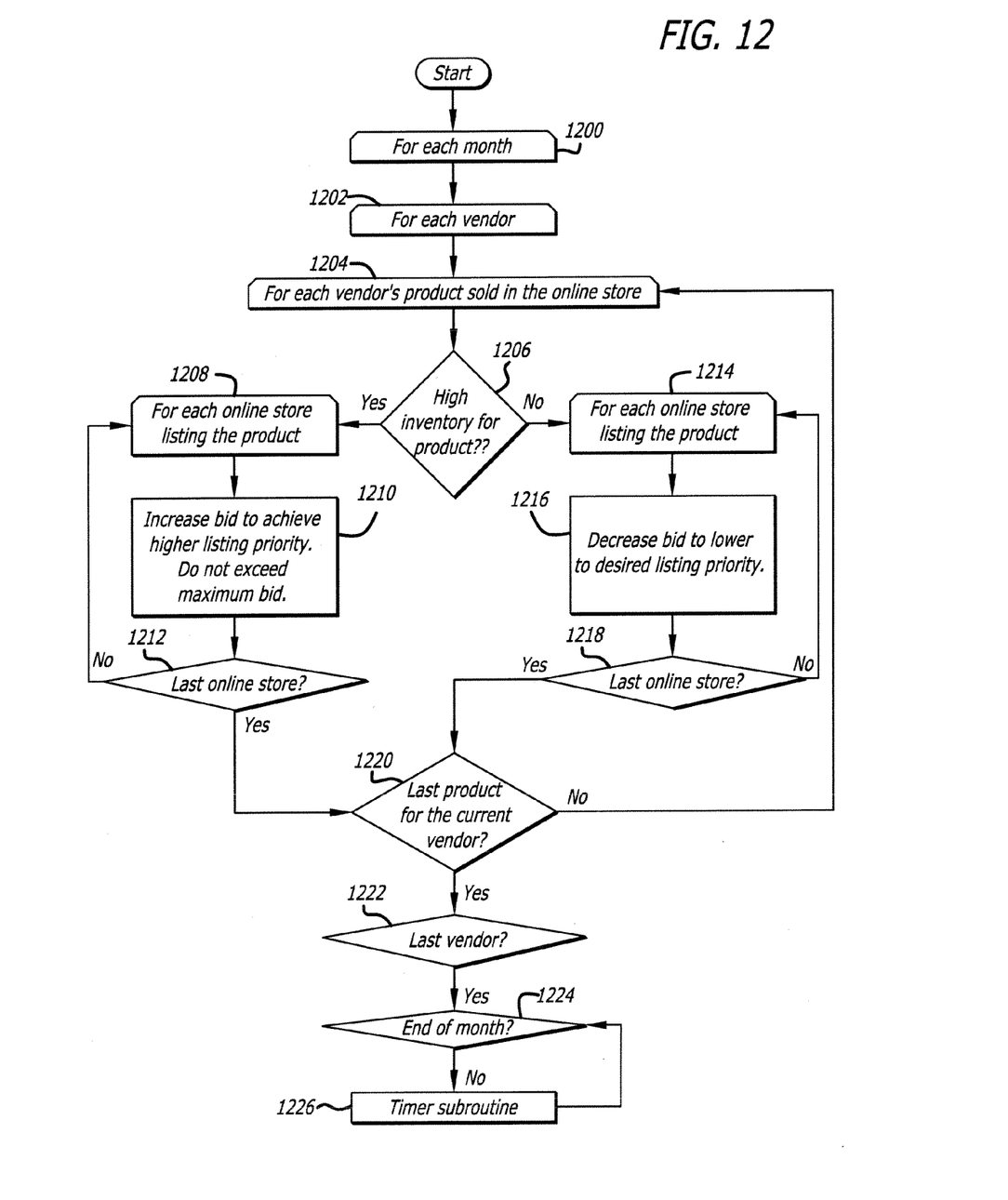
FIG. 12 is a flow diagram illustrating a method performed by the system of FIG. 11.

With reference to FIG. 12 a flow diagram illustrating a method performed by the online bid management systems 102 of FIG. 11 is shown. The method is for automatically managing an auction for determining relative priority for listing products in a system wherein listing order is based on the relative value of related bids. The system is programmed into a series of nested loops. The outer loop, starting at step 1200, comprises a timing mechanism which times the updating of bids for a plurality online stores 158. At step 1202, the system loops through the vendors having products tracked in the online bid management system 102. At step 1204, the system loops through each product for the current vendor.

The system checks for whether the product has a high inventory with respect to the other vendor's products, step 1208. If the product is found to have a high inventory, then the processing moves to step 1208 where the system sets a loop to adjust bids in each online store for the product. The bid is increased to give the product a higher listing priority, step 1210 without exceeding the maximum bid. Alternatively, the system may adjust the maximum bid for listing the product in the online store in step 1210. The bid management system 102 checks for whether the last online store has been processed for the product, step 1212. If the last online store has not been processed, then processing moves back to step 1208.

If the product was found to not have a high inventory in step 1206 relative to other products, then the system sets a loop through each online store listing the product, step 1214. For each online store, the bid is lowered for the product in order to lower the priority of listing for the product, step 1216. The bid management system 102 checks for whether the last online store has been processed for the product, step 1218. If the last online store has not been processed, then processing moves back to step 1214.

The bid management system 102 checks for whether the last product for the current vendor has been processed, step 1220. If not, then processing moves back to step 1204. Otherwise, the system checks for whether the last vendor has been processed, step 1222. If not, then processing moves back to step 1202. Otherwise, the system checks the timing loop, in this case each month, for whether it is time to process all of the vendors' product inventors again, steps 1224-1226. Once the timer has determined that it is time to check the vendors' inventories again, processing moves back to step 1200.

It will thus be seen that the objects set forth above, among those made apparent from the preceding description, are provided and, since changes may be made in carrying out the above system and method and in the construction set forth without departing from the spirit and scope of the invention, it is intended that any and all matter contained in the above description and shown in the accompanying drawings shall be interpreted as illustrative and not in a limiting sense.

What is claimed is:

1. A method for automatically managing an auction for determining relative priority for a service in a system wherein priority is based on the relative value of related bids, comprising:

receiving bid management data from a first bidder for managing bidding by the first bidder in the auction, the auction having at least two or more positions of priority, the received bid management data including information for selecting one of the two or more positions of priority that the first bidder wishes to maintain in the auction;

checking for if a second bidder holds the selected position of priority, and checking for whether a first bid from the first bidder exceeds a second bid from the second bidder in the auction for determining continuing priority for providing an ongoing service for the first and second bidder, wherein the relative position of priority for providing the service for the first bidder is dependent on whether the value of the first bid exceeds the value of the second bid, and wherein the relative position of priority for providing the service for the second bidder is dependent on whether the value of the second bid exceeds the value of the first bid;

according to the bid management data received from the first bidder, automatically incrementing the first bid to a value exceeding the second bid if the first bid does not exceed the second bid, to thereby maintain the selected position of priority for providing the service for the first bidder;

checking for whether the first bid is higher than needed to maintain the selected position of priority that the first bidder wishes to maintain in the auction, and if the first bid is higher than needed to maintain the selected position of priority that the first bidder wishes to maintain in the auction, automatically reducing the first bid to a minimum which allows the bidder to keep the selected position of priority.

2. The method of claim 1, further comprising executing the steps of checking and incrementing a plurality of times.

3. The method of claim 2, further comprising pausing for a fixed period of time between each series of steps of checking and incrementing.

4. The method of claim 3, wherein the service to bidders comprises providing ranking of hypertext links to web pages in search results in an on-line web page search engine.

5. The method of claim 4, wherein the ranking of a first hypertext link to a first web page for the first bidder is higher than the ranking of a second hypertext link to a second web page for the second bidder if the first bid is higher than the second bid.

6. The method of claim 5, comprising placing bids on a plurality of search terms which may be typed into the search engine by search engine users wherein different ranking is determined for each search term.

7. The method of claim 6, wherein the ranking of the first hypertext link is higher than the second hypertext link if the first bid is higher than the second bid for each of the plurality of search terms.

8. The method of claim 7, wherein the step of checking and incrementing is executed for a plurality of search engines for a plurality of search terms.

9. The method of claim 1 wherein the service to bidders comprises providing ranking of priority for golf course tee-off times on one or several golf courses.

10. The method of claim 1 wherein the service to bidders comprises providing ranking of priority for airline reservations on one or several airlines.

11. A system for automatically managing an auction for determining relative priority for a service in a system wherein priority is based on the relative value of related bids, comprising:
- an input device for receiving bid management data from a first bidder for managing bidding by the first bidder in the auction, the auction having at least two or more positions of priority, the received bid management data including selected one of the two or more positions of priority that the first bidder wishes to maintain in the auction;
- a processor electrically connected to a network for checking for if a second bidder holds the selected position of priority, and for checking for whether a first bid from the first bidder exceeds a second bid from a second bidder in the auction for determining continuing priority on a server electrically connected to the network for providing an ongoing service for the first and second bidder, wherein the relative position of priority for providing the service for the first bidder is dependent on whether the value of the first bid exceeds the value of the second bid, and wherein the relative position of priority for providing the service for the second bidder is dependent on whether the value of the second bid exceeds the value of the first bid, and for automatically incrementing the first bid according to the bid management data received from the first bidder to a value exceeding the second bid if the first bid does not exceed the second bid, to thereby maintain the selected position of priority for providing the service for the first bidder; and
- a database electrically connected to the processor for storing the first and second bids;
- the processor further for checking for whether the first bid is higher than needed to maintain the selected position of priority that the first bidder wishes to maintain in the auction,
- the processor further for automatically reducing the first bid to a minimum which allows the bidder to keep the selected position of priority if the first bid is higher than needed to maintain the selected position of priority that the first bidder wishes to maintain in the auction.

12. The system of claim 11, wherein the processor is further for checking and incrementing the first bid a plurality of times.

13. The system of claim 12, wherein the processor is further for pausing for a fixed period of time between each checking and incrementing of the first bid.

14. The system of claim 13, wherein the service to bidders comprises providing ranking of hypertext links to web pages in search results in an on-line web page search engine stored on the server.

15. The system of claim 14, wherein the server is further for ranking of a first hypertext link to a first web page for the first bidder higher than the ranking of a second hypertext link to a second web page for the second bidder if the first bid is higher than the second bid.

16. The system of claim 15, wherein the processor is further for placing bids on a plurality of search terms which may be typed into the search engine by search engine users wherein different ranking is determined for each search term.

17. The system of claim 16, wherein the server is further for setting the ranking of the first hypertext link higher than the second hypertext link in a search result if the first bid is higher than the second bid for each of the plurality of search terms.

18. The system of claim 17, further comprising a plurality of servers electrically connected to the network.

19. The system of claim 18, further comprising a plurality of search engines on the plurality of servers.

20. The system of claim 19, wherein the processor is further for checking and incrementing a plurality of bids for the first bidder on the plurality of search engines.

21. The system of claim 11 wherein the service to bidders comprises providing ranking of priority for golf course tee-off times on one or several golf courses.

22. The system of claim 11 wherein the service to bidders comprises providing ranking of priority for airline reservations on one or several airlines.

23. The method of claim 1, further comprising executing a plurality of times the step of automatically reducing the first bid to a minimum which allows the bidder to keep the selected position of priority if the first bid exceeds a value needed to maintain the selected position of priority.

24. The system of claim 11, wherein the processor is for further for automatically reducing the first bid a plurality of times to a minimum which allows the bidder to keep the selected position of priority if the first bid exceeds a value needed to maintain the selected position of priority.

* * * * *